US00RE47021E

(19) United States
(12) Reissued Patent
Churchill et al.

(10) Patent Number: US RE47,021 E
(45) Date of Reissued Patent: Sep. 4, 2018

(54) WATER SPORT TRAINING DEVICE

(71) Applicant: Mary Louise Churchill, Redlands, CA (US)

(72) Inventors: Robert Lee Churchill; Mary Louise Churchill, Redlands, CA (US)

(21) Appl. No.: 14/603,206

(22) Filed: Jan. 22, 2015

Related U.S. Patent Documents

Reissue of:
(64) Patent No.: 8,696,396
Issued: Apr. 15, 2014
Appl. No.: 13/495,439
Filed: Jun. 13, 2012

U.S. Applications:
(63) Continuation-in-part of application No. 13/217,465, filed on Aug. 25, 2011, now abandoned, which is a
(Continued)

(51) Int. Cl.
*B63B 1/00* (2006.01)
*B63B 35/81* (2006.01)
*B63B 35/73* (2006.01)

(52) U.S. Cl.
CPC ..... *B63B 35/811* (2013.01); *B63B 35/812* (2013.01); *B63B 35/815* (2013.01); *B63B 2035/735* (2013.01)

(58) Field of Classification Search
CPC ..... B63B 35/811; B63B 35/812; B63B 35/58; B63B 35/607; B63B 35/613; B63B 35/74;
(Continued)

(56) References Cited

U.S. PATENT DOCUMENTS 1,960,474 A 5/1934 Browne
2,334,072 A 11/1943 Cooper
(Continued)

FOREIGN PATENT DOCUMENTS

WO WO 2006/068506 6/2006

OTHER PUBLICATIONS

Scatback https://web.archive.org/web/20010418013007/http://www.obrien.com/products/tubes/tubespec.asp?ID=9 Jan. 5, 2015.
(Continued)

*Primary Examiner* — Patricia Engle
(74) *Attorney, Agent, or Firm* — Knobbe, Martens, Olson & Bear, LLP

(57) ABSTRACT

A water sport training device is disclosed comprising, in one embodiment, a raft having a distal nose portion and a proximal rear portion. The rear portion provides a pair of substantially spaced apart lateral pontoons and a first web spanning the space therebetween. A relatively rigid platform is positionable within the raft, substantially adjacent the first web. A buoyant seat portion is positioned substantially on a back half of the device between the pontoons and adjacent the platform. A tow rope attachment means is secured to the raft for selectively towing the device over a body of water. The device is configured such that a back half of the device has a center buoyancy sufficient for providing a stable surface to support the weight of a person while floating on water both at standstill and as being pulled through the water as by a boat.

33 Claims, 13 Drawing Sheets

Related U.S. Application Data continuation-in-part of application No. 12/355,615, filed on Jan. 16, 2009, now Pat. No. 8,025,541.

(58) Field of Classification Search

CPC ..... B63B 35/76; B63B 35/78; B63B 35/815; B63B 2035/735

See application file for complete search history.

(56) References Cited

U.S. PATENT DOCUMENTS 2,841,805 A 7/1958 Roudebush
3,082,443 A * 3/1963 Kimura ..... B63B 35/81 441/65
3,098,247 A 7/1963 Stein et al.
3,145,399 A 8/1964 Jackson
3,352,275 A 11/1967 Wilson
3,358,304 A 12/1967 Esmay
3,455,571 A 7/1969 Dallera et al.
3,585,664 A 6/1971 Thompson
3,659,298 A 5/1972 Edwards
3,807,342 A * 4/1974 Turner ..... B63B 35/815 114/253
4,460,344 A 7/1984 Notermann
4,552,539 A * 11/1985 Hoenstine ..... B63B 35/76 441/131
4,606,728 A 8/1986 Simpson
D290,108 S 6/1987 Wolfe
4,678,444 A * 7/1987 Monreal ..... B63B 35/81 114/363
4,697,762 A 10/1987 Arney
4,779,555 A 10/1988 Hong
4,807,554 A * 2/1989 Chi-Hung ..... B63B 7/08 114/253
4,811,682 A 3/1989 Hwang et al.
D300,841 S 4/1989 Minurri
4,865,572 A 9/1989 Andes
4,871,337 A 10/1989 Harris
D309,128 S 7/1990 Walker et al.
4,951,960 A 8/1990 Sadler
D315,771 S 3/1991 Olson et al.
5,006,087 A * 4/1991 Peterson ..... B63B 7/08 114/345
5,083,955 A * 1/1992 Echols ..... B63B 35/815 114/253
5,163,860 A * 11/1992 Clark ..... B63B 35/815 114/253
5,184,564 A 2/1993 Robbins et al.
5,279,510 A * 1/1994 Remy ..... B63B 39/005 114/345
5,282,437 A 2/1994 Avillez de Basto
5,360,360 A 11/1994 Peterson
5,433,636 A 7/1995 Gillis
5,503,099 A * 4/1996 Peterson ..... B63B 35/73 114/253
5,662,506 A 9/1997 Reinhardt, Jr. et al.
5,713,773 A 2/1998 Churchill
6,024,042 A 2/2000 Eilert
6,131,532 A 10/2000 Winner et al.
6,155,899 A 12/2000 Boddy
6,306,000 B1 10/2001 Parten et al.
6,386,932 B1 5/2002 Murphy
D505,653 S 5/2005 Watling
6,923,454 B2 8/2005 Drako
7,261,607 B1 8/2007 Klimenko
D580,005 S * 11/2008 Peterson ..... D21/803
8,696,396 B1 4/2014 Churchill
2006/0110992 A1* 5/2006 Klimenko ..... B60V 1/08 441/40
2008/0207068 A1* 8/2008 Rockstad ..... B63B 7/08 441/66
2012/0034585 A1* 2/2012 Plante ..... A63B 69/187 434/253

OTHER PUBLICATIONS

Rocket https://web.archive.org/web/20010418010712/http://www.obrien.com/products/tubes/tubespec.asp?ID=10 Jan. 5, 2015.

* cited by examiner

WATER SPORT TRAINING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This is a continuation-in-part application of U.S. non-provisional application Ser. No. 13/217,465, filed Aug. 25, 2011 now abandoned and entitled "Water Sport Training Device," which is itself a continuation-in-part of U.S. non-provisional application Ser. No. 12/355,615, filed Jul. 16, 2009, now U.S. Pat. No. 8,025,541. Furthermore, this application is entitled to the priority date of the aforementioned application, the contents of which are incorporated by reference herein.

INCORPORATION BY REFERENCE

Applicants hereby incorporate herein by reference any and all U.S. patents and U.S. patent applications cited or referred to in this application.

FIELD OF THE INVENTION

Aspects of this invention relate generally to water sports, and more particularly to a water sport training device.

DESCRIPTION OF RELATED ART

The following art defines the present state of this field:

Water sport training devices are well known in the art. For example, U.S. Pat. No. 4,460,344 to Notermann on Jul. 17, 1984 teaches such a device. Such devices are designed to make the sport of water skiing easier to learn and enjoy for water skiers. However, despite the development of many approaches to water sport training, these approaches often have significant drawbacks.

A major challenge in water skiing is keeping the two skis close together in a parallel position. One solution to this problem is to connect the two skis at a fixed distance. U.S. Pat. No. 4,460,344 to Notermann on Jul. 17, 1984 teaches such a device with a pair of skis connected together.

Another approach is to use a one piece U-shaped device that simulates the experience of two separate skis. Both U.S. Pat. No. 2,841,805 to Roudebush on Jul. 8, 1958 and U.S. Pat. No. 3,585,664 to Thompson on Sep. 5, 1969 teach such a U-shaped water ski device. These devices can require starting from the shore or from very shallow water which can be very dangerous for beginning skiers. In many lakes and streams it is against the law to start from the shore.

All of these devices provide solutions to the problem of keeping skis parallel and close together. However, similar to water skis, these hybrid devices require a relatively high minimum speed to prevent the rider from sinking. Before water planing occurs, the force of the water against the skis creates a substantial amount of resistance and requires considerable leg strength and balance in order to initiate planing. Therefore, a device is needed that makes it easier to stand in an upright position on the device before planing is initiated and not requiring the skier to start from shallow water or dry land.

One approach to make the transition from a non-moving position to a standing moving position is to provide a seat for the skier. U.S. Pat. No. 4,606,728 to Simpson on Aug. 19, 1986 teaches an inflatable seat as a water ski aid, wherein the inflatable seat does not travel with the ski, and U.S. Pat. No. 4,865,572 to Andes on Sep. 12, 1989 teaches an attached support seat for a ski but does not have an inflatable buoyant rider support. Standing on the skis is easier starting from a seated position above the water. Despite the benefit of providing a seat, neither of these devices provide any alternative solution, other than a curved front lip, to the problem of the front of the ski submerging under the water when being towed. Therefore a device is needed that reduces the tendency of a towed object being pulled underwater.

As mentioned, another challenge in water-skiing is keeping the nose of the ski from diving under the water. This is also true for water sport devices that can be towed without a person on the device. Such devices are usually designed with the front edge extending upwards to avoid the front diving into the water. U.S. Pat. No. 6,386,932 to Murphy on May 14, 2002 teaches a hydrofoil water sport device that uses inflatable pontoons on each side of the hydrofoil, in addition to having a front edge extending upwards. The inflatable pontoons give the hydrofoil device additional buoyancy that reduces the tendency of the device to dive into the water when being towed. The pontoons must be enlarged in such a device to achieve sufficient buoyancy. However, despite features to reduce dive tendency of a device when towed without a rider, the Murphy device teaches and requires a user to manually hold the tow rope attached directly to the boat. As such, the device cannot be towed without a rider or when capsized. The device does not have an inflatable or substantially buoyant center seat which is preferable to support and stabilize the rider and allow the device to be towed by the boat. With the tow rope in the skier's hands, the skier will feel the full force of the boat pulling the tow rope, which requires a great deal of upper body strength and coordination to hold on. Therefore a water-skiing training device is needed that does not require the skier to directly hold the tow rope being pulled by the boat, while it also provides for a reduced tendency to dive when the device is either upright or capsized.

U.S. Pat. No. 6,306,000 to Parten et al. on Oct. 23, 2001 teaches the use of a training platform designed to be attached to the boat. This towing system attempts to reduce the breakage that is inherent from the present tow systems which attach the tow rope to the water planing devices. However, breakage is not significantly reduced with such a device because the tow system does not substantially reduce the diving inherent from ski platforms and because the tow rope is attached directly to the training platform, creating stress points on the platform. Therefore, a water-skiing training device is needed that provides for reduced diving tendency when being towed and that provides a more efficient attachment means that does not attach directly to the training platform.

U.S. Pat. No. 5,713,773 to Churchill on Feb. 3, 1998 teaches an inflatable water sport device with seat and handles not attached directly to the main tow rope. The problem of direct force on the rider from the tow rope is alleviated by connecting the tow rope to the front of the vehicle and having two handles attached to the front of the device for the rider to hold for stability without requiring a great deal of upper body strength. However, because of the fixed location of the handles of the Churchill device, no adjustment can be made for the height of the rider as the rider moves from a seated position to a standing position.

Also the device does not provide for a rigid or semi-rigid floor upon which a skier may stand because the device is only an inflatable and does not provide the stability necessary for standing. Therefore a water-skiing training device is needed that provides a handle that can adjust with the skier as the skier stands, and a rigid or semi-rigid floor, as well as a bottom planing surface area that replicates the parallel position of water skis. It would be desirable to provide an inflatable water sport training device that is capable of planing at low speeds and maintaining structural rigidity to allow for low speed towing. It would also be desirable to provide an inflatable water sport training device that is capable of being towed when in either an upright or capsized position.

As the prior art shows, a variety of water sport training devices already exists. A popular training device is the one-piece U-shaped ski. Even though the U-shaped ski can be difficult to use for young and new skiers and may require shore starts and assistance to hold the skier above water, this device is a good intermediate training device before attempting to ski on traditional water sports. However, it can become expensive to buy multiple water sport training devices. Preferably, a needed training device would use the popular U-shaped platform, while also accommodating the needs of more advanced skiers. Therefore a water sport training device is needed that can incorporate a wide variety of existing water sport training platform shapes.

Thus, there is a need for a water sport training device that solves the problem of keeping skis together in a parallel position as well as, in an exemplary embodiment, provide a seat to make it easier to stand in an upright position on the device. The needed invention would, in an exemplary embodiment, provide beginners the advantage of starting from a dry out-of-the-water seated position. The needed invention would also include inflatable stability bladders to reduce the tendency of a towed object being pulled underwater while either upright or capsized. Additionally, the needed invention may incorporate existing water sport training platform shapes made of wood or other materials. The needed invention would further provide the stability from the combined inflatable bladder with the rigid or semi-rigid platform necessary to train users in basic water skiing and related towable water sport activities.

Aspects of the present invention fulfill these needs and provide further related advantages as described in the following summary.

SUMMARY OF THE INVENTION

Aspects of the present invention teach certain benefits in construction and use which give rise to the exemplary advantages described below.

The sport of towing a rider on a water-planing device behind a boat is well known. The types of devices may generally be divided into the categories of water skis, water planes, aquaplanes, and inflatables. Water skis have the advantages of control and versatility. However, water skiing requires a development of sufficient strength to hold onto a tow rope while maintaining the skis in a parallel relationship and standing erect while doing both. This makes water skiing a difficult and often frustrating sport for the beginner, requiring the simultaneous development and use of arm strength, leg strength and balance.

When water skiing, a skier can find it difficult to maintain balance when being pulled from a floating starting position, in which the skier and skis are partially submerged, to the skiing position, in which the skis ride on the water surface. Moreover, when the skier is pulled from the submerged starting position, the pulling force from the tow rope tends to pull the arms and upper body of the skier in one direction, while the skis are pushed by the water in the opposite direction. This causes considerable problems for beginners and intermediate skiers, and can even be difficult for proficient skiers.

It would be desirable to provide a water sport training device for towing behind a boat or the like which may be used by beginners or accomplished skiers, by providing the stability needed by beginners as well as adjustability for skill level for increasing the challenge and controllability for advanced skiers. It is to such a device that the present invention is directed.

The present device is a water sport training device for supporting the weight of a person floating on water both at standstill and as being pulled through the water as by a boat. In one embodiment, the device comprises a raft having a distal nose portion and a proximal rear portion. A relatively rigid platform is positioned within the raft and configured to provide a stable surface for the person during use of the device. A tow rope attachment means is secured to the raft for selectively towing the device over a body of water, the attachment means comprising at least one tow rope attachment point located on the nose portion of the raft. The device is configured such that a back half of the device has a center buoyancy sufficient for providing a stable surface to substantially support the weight of a person both while in motion and at rest.

Thus, the present invention solves the problem of keeping skis together in a parallel position for new skiers, makes it easier to stand in an upright position on the device, and reduces the tendency of a towed object diving underwater. The present invention provides floatation and stability to train skiers in all basic maneuvers. The buoyancy of the present invention allows the rider to float and start from a dry out-of-the-water seated position. Furthermore, the present device avoids the difficulty of the skier holding the tow rope connected to the boat and instead provides a handle attached directly to the raft that can adjust to the height of the skier as the skier stands. Additionally, the present invention may incorporate existing water sport training platforms, such as a wood, plastic, or fiberglass shaped ski trainer, a foam body board, a wakeboard, a surfboard, water skis, etc.

Other features and advantages of aspects of the present invention will become apparent from the following more detailed description, taken in conjunction with the accompanying drawings, which illustrate, by way of example, the principles of aspects of the invention.

It should be noted that, for illustrative purposes, the present invention, as well as the associated background history, is discussed primarily in the context of water skiing. However, the present invention should not be read as being so limited. In fact, the present invention can be used in connection with virtually any type of water sport activity and related planing devices, towable or otherwise, now known or later developed.

BRIEF DESCRIPTION OF THE DRAWINGS

The accompanying drawings illustrate aspects of the present invention. In such drawings.

DETAILED DESCRIPTION OF THE INVENTION

The above described drawing figures illustrate aspects of the invention in at least one of its exemplary embodiments, which are further defined in detail in the following description.

Figure 1:
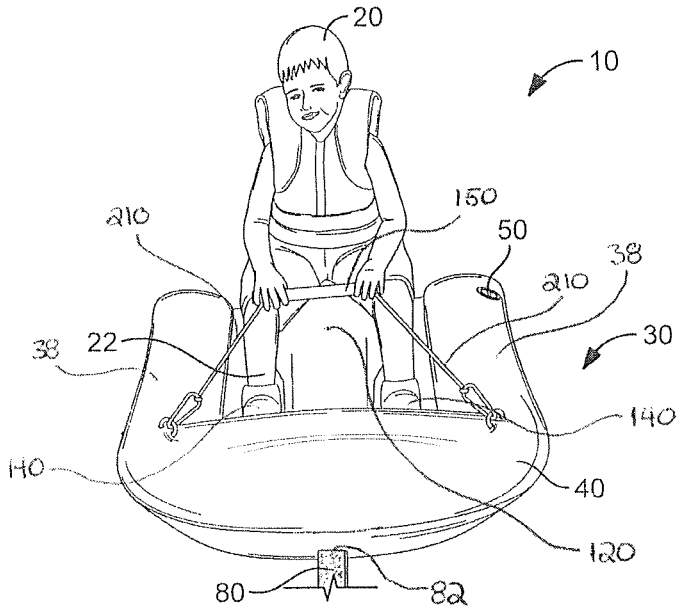
FIG. 1 is a perspective view of an exemplary embodiment of the invention with a person in a seated position floating or being towed.

With respect to the drawings, FIG. 1 illustrates a first exemplary embodiment of a water sport training device 10 for supporting the weight of a person 20 floating on water 12 both at standstill and as being pulled through the water 12 as by a boat (not shown). The device 10 includes a buoyant raft 30 having a distal nose portion 42 and a proximal rear portion 44. In the preferred embodiment, the nose portion 42 and rear portion 44 are an inflatable bladder 40. In alternate embodiments, the nose portion 42 and rear portion 44 are made of foam, molded plastic, or any other material or method of manufacture, now known or later developed, having sufficiently buoyant properties. For the purposes of this disclosure, bladder 40 will be used to illustrate and describe the present invention.

Figure 4:
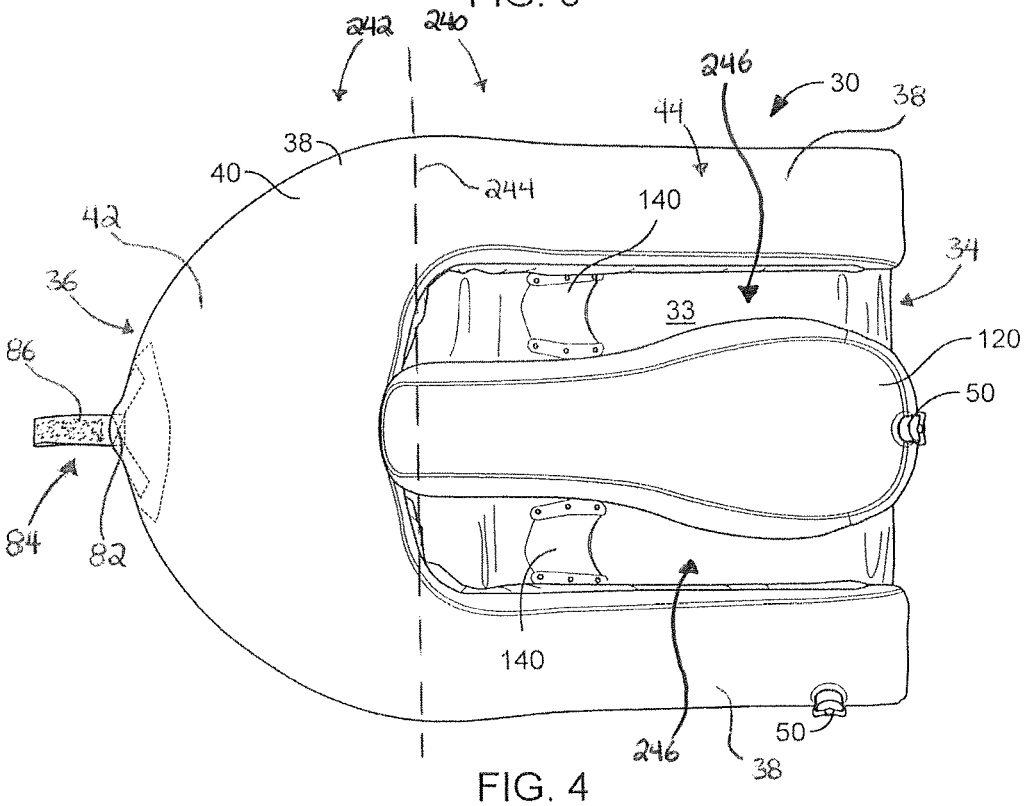
FIG. 4 is a top plan view thereof.
Figure 5:
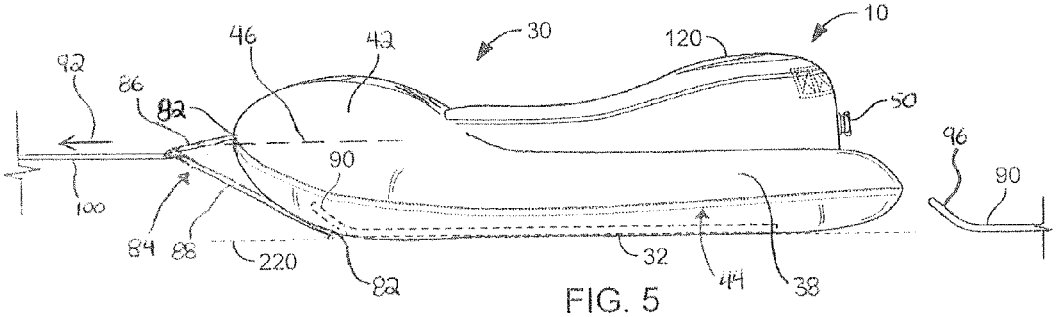
FIG. 5 is a partial exploded view thereof, showing the platform outside the raft and in phantom outline the approximate position of the platform within the platform pocket.
Figure 7:
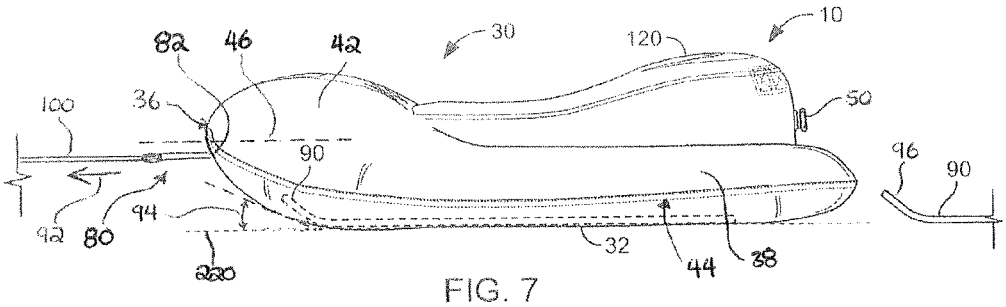
FIG. 7 is a partial exploded view of an alternate embodiment of the invention, showing the platform outside the raft and in phantom outline the approximate position of the platform within the platform pocket.
Figure 11:
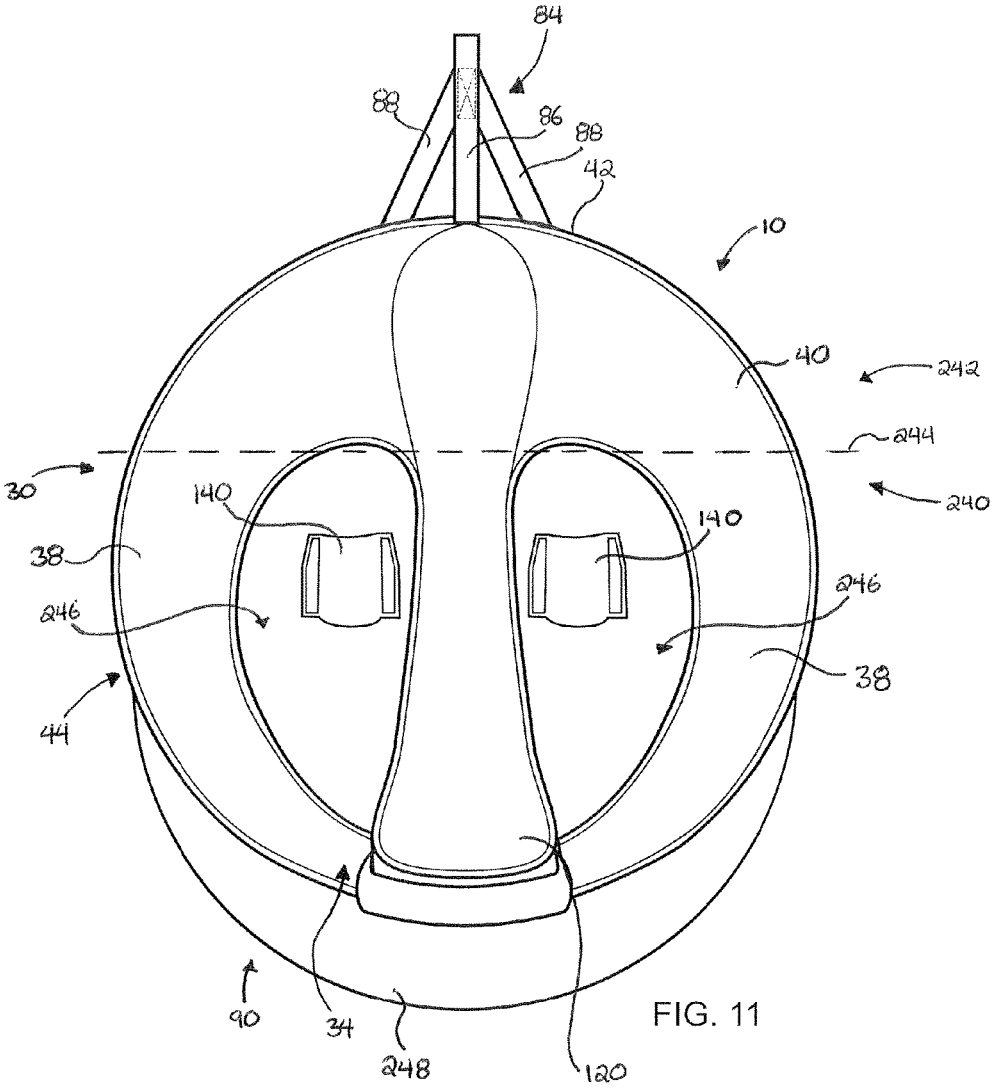
FIG. 11 is a top plan view of another embodiment of the invention, wherein the raft and platform are substantially circular-shaped.

The bladder 40 includes at least one inflation valve 50 (FIG. 1) through which a gas (not shown), such as air, may be selectively introduced into the bladder 40. The raft 30 and bladder 40 are preferably made from a lightweight, durable, flexible, waterproof material such as a rubber or vinyl material, but may also be formed from any suitable durable material, now known or later developed, such as a durable flexible plastic material. The raft 30 may further be covered with nylon or other fabrics. In a preferred embodiment, the inflatable bladder 40 is U-shaped in plan view (FIG. 4), and the rear portion provides a pair of buoyant lateral pontoons 38. As shown in FIG. 5, the nose portion 42 defines a nose portion mid-plane 46 substantially midway through a horizontal thickness of the nose portion 42. In alternate embodiments, the bladder 40 can also be substantially C-shaped, V-shaped, W-shaped, O-shaped (FIG. 11), or D-shaped (FIG. 19) in plan view, with the rear portion still providing lateral pontoons 38. In the preferred embodiment, as best shown in FIG. 7, the nose portion 42 is curved in an upward direction with respect to the rear portion 44, such that it creates an acute angle 94 with an imaginary plane 220 of a bottom surface 32 of the raft 30. This prevents the nose portion 42 from submerging under the water 12 when the device 10 is being towed, regardless of whether there is a person 20 on the device 10.

As best shown in FIG. 5, a relatively rigid platform 90 is positioned within the raft 30, proximal to the nose portion 42. The platform 90 is configured to provide a stable surface for the person 20 during use of the device 10. Further details regarding the platform 90 are discussed below.

Figure 3:
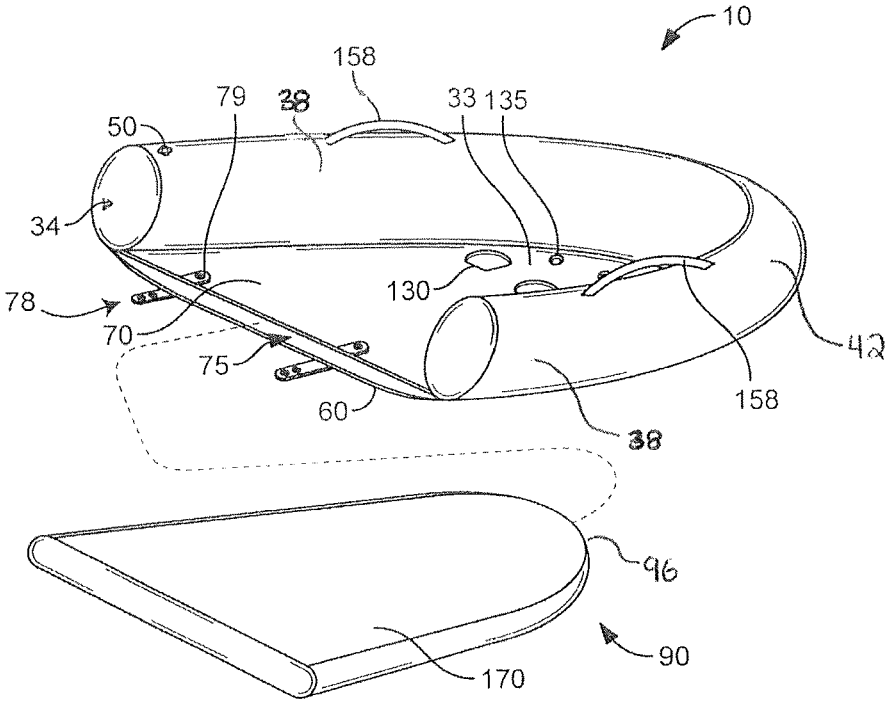
FIG. 3 is a perspective view illustrating the removable insertion of a platform into a platform pocket of an exemplary embodiment of the invention.

In the preferred embodiment, as shown in FIGS. 3 and 5, a first web 60 spans a perimeter of the raft 30, defining the bottom surface 32 of the raft 30. In FIGS. 3 and 4, a second web 70 also spans the raft 30, offset from the first web 60, defining a top surface 33 of the raft 30. The first web 60 and second web 70 cooperate to define a platform pocket 75 having a selectively closable pocket aperture 76, sized and configured to removably receive the platform 90, and preferably positioned at a rear side 34 of the raft 30, illustrated in FIG. 3. The pocket aperture 76 is selectively closable using an aperture closure means 78. Preferably, the aperture closure means 78 are zippers (not shown). Alternately, the aperture closure means 78 are mechanical snaps 79 attached to the first web 60 and second web 70. Other aperture closure means 78 include hook-and-loop type fasteners, snaps, tabs that can be tied together (not shown), or any other closure means now known or later developed. FIG. 3 illustrates a relatively rigid platform 90 removably insertable into the platform pocket 75 via the pocket aperture 76. This allows the person 20 to selectively change the type of platform 90 to use with the device, creating a much more versatile and marketable product. In a still further embodiment, the pocket aperture 76 is permanently sealed, such as by sewing, thermal welding or any other method now known or later developed, once the platform 90 has been inserted into the platform pocket 75.

Figure 8:
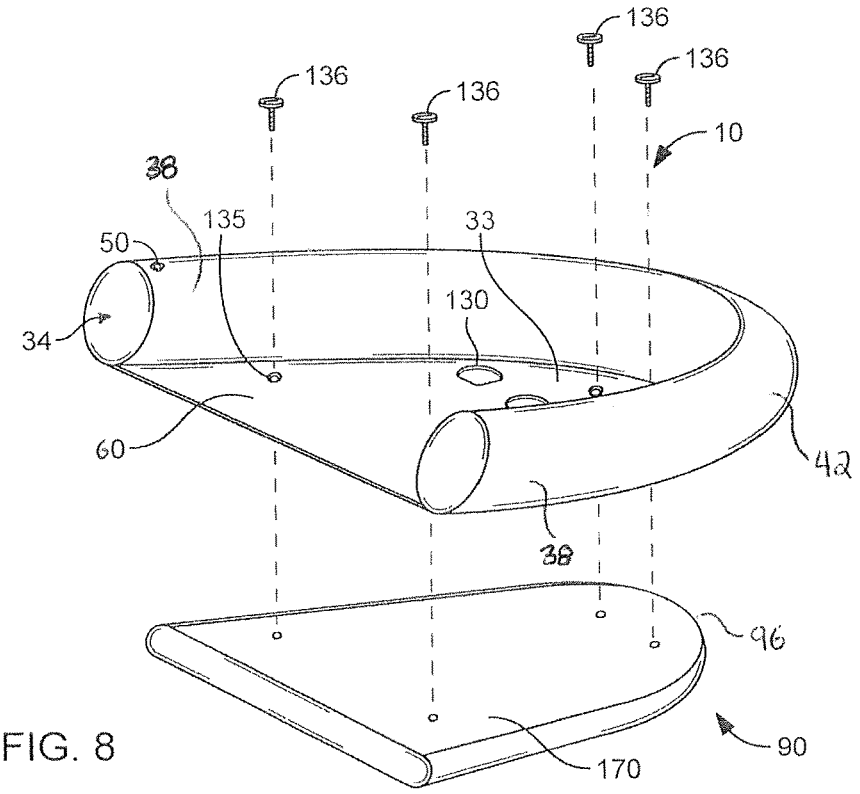
FIG. 8 is an exploded view of one embodiment of the invention.
Figure 9:
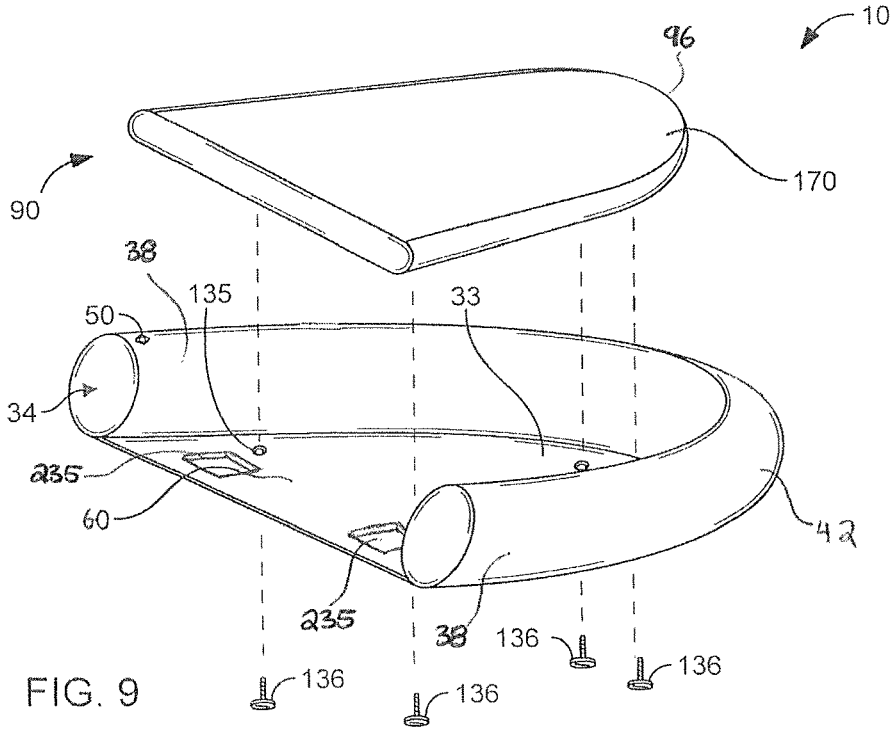
FIG. 9 is an exploded view of another embodiment of the invention.

In alternate embodiments, shown in FIGS. 8 and 9, the first web 60 defines both bottom surface 32 and top surface 33 of the raft 30. The platform 90 is permanently or removably secured to the bottom surface 32 (FIG. 8) or top surface 33 (FIG. 9) using glue, lamination, mechanical fasteners or any other means for affixing the platform 90 to the bottom or top surfaces 32 and 33, now known or later developed. In one alternate embodiment, as shown in FIGS. 8 and 9, the first web 70 defines a plurality of fastener apertures 135 through which mechanical fasteners, such as plastic screws 136, may be inserted and secured to the platform 90, either from above (FIG. 8) or from below (FIG. 9).

In still further embodiments, such as those shown in FIGS. 14-18, the platform 90 may be simply placed in removable contact with the top surface 33, enabling relatively quick and easy removal of the platform as desired. In a bit more detail, with reference to FIGS. 14 and 17, each of the pontoons 38 preferably provides a lateral recess 252 along the top surface 33 when the pontoons 38 are inflated, each of the lateral recesses 252 being sized and configured for receiving and sandwiching a corresponding lateral edge 254 of the platform 90 between the corresponding pontoon 38 and the top surface 33 of the raft 30. Similarly the nose portion 42 preferably provides a nose recess 256 along the top surface 33 when the nose portion 42 is inflated, the nose recess 256 being sized and configured for receiving and sandwiching a leading edge 258 of the platform 90 between the nose portion 42 and the top surface 33 of the raft 30. Thus, with the platform 90 selectively positioned in contact with the top surface 33 and the raft 30 subsequently inflated, the lateral recesses 252 and nose recess 256 function to substantially prevent the platform 90 from becoming unintentionally disengaged from the raft 30 during use of the device 10. Thus, as discussed further below, the same raft 30 may be selectively used in conjunction with a number of different types of platforms of varying shapes and sizes.

Figure 2:
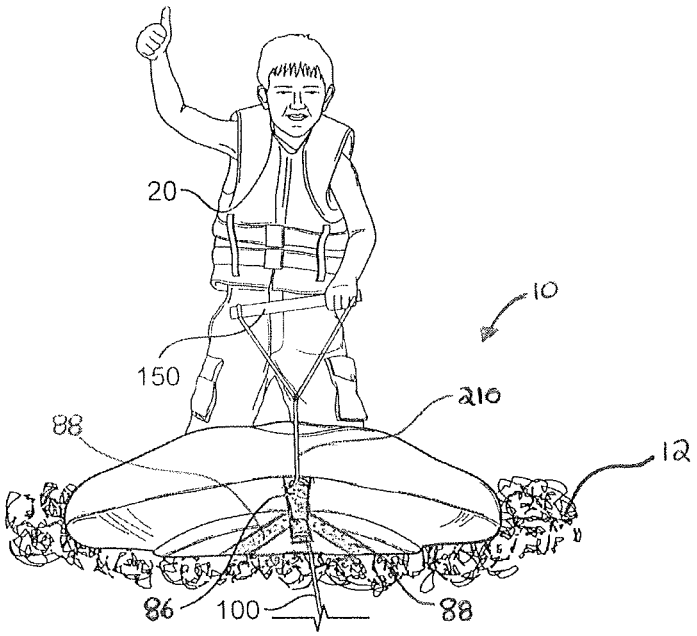
FIG. 2 is a perspective view thereof, with a person in a standing position.

In FIGS. 2 and 5, a tow rope attachment means 80 is secured to the raft 30 for selectively towing the device 10, via a removably engagable tow rope 100, over the water 12, whereby the person 20 is supported by the platform 90 and the raft 30. In one embodiment, the tow rope attachment means 80 comprises at least one tow rope attachment point 82 located on the nose portion 42 below the nose portion mid-plane 46, as shown in FIG. 7. In another embodiment, shown best in FIG. 5, the tow rope attachment means 80 is a strap assembly 84 comprising an at least one elongate upper strap portion 86, engaged proximally with the nose portion 42 of the raft 30 and distally with an at least one elongate lower strap portion 88, the lower strap portion 88 engaged proximally with the nose portion 42 below the nose portion mid-plane 46. As illustrated in FIG. 5, each of the at least one lower strap portions 88 is at least twice as long as each of the at least one upper strap portions 86. Preferably, the strap assembly 84 comprises one upper strap portion 86 and two lower strap portions 88, forming a tripod-like engagement with the nose portion 42 when the device 10 is being towed. With the tow rope attachment means 80 secured to the raft 30 as described above, the direction of pull force 92 applied to the tow rope attachment means 80, during use of the device 10, is substantially parallel with and below the nose portion mid-plane 46. Thus, the nose portion 42 will tend to not submerge when the device 10 is in use, nor will the device 10 be able to lift up out of the water 12, due to the angle and direction of the pull force 92 in combination with the location of the tow rope attachment means 80. It should also be noted that having the tow rope attachment means 80 secured to the nose portion 42, rather than directly to the rigid platform 90, ensures that the platform 90 will not be caused to break due to the tensions of being pulled through the water 12 and possibly submerged while the device 10 is in use, since these tensions will be acting upon the resilient nose portion 42 instead. This benefit is a great improvement over the cited prior art.

In preferred embodiment, as best shown in FIGS. 1 and 2, a handle 150 is interconnected with the device 10, either permanently or removably, by an at least one handle rope 210. The handle 150 is configured to allow the person 20 to selectively support himself in a standing position (FIG. 2) on the platform 90 while being towed across the water 12. In one embodiment, the handle 150 is connected directly to the raft 30 (FIG. 1). In another embodiment, the handle 150 is connected to the tow rope attachment means 80 (FIG. 2). In yet another embodiment, the handle 150 is connected directly to the tow rope 100 (not shown). The means by which the handle 150 is connected to the device 10 may include any material or method now known or later developed, such as stitching, knotting, mechanical fasters or glue. In one embodiment, an at least one hand hold 158 (FIG. 3) is engaged with the raft 30 and configured for assisting the person 20 in holding on while the device 10 is in use.

Figure 12:
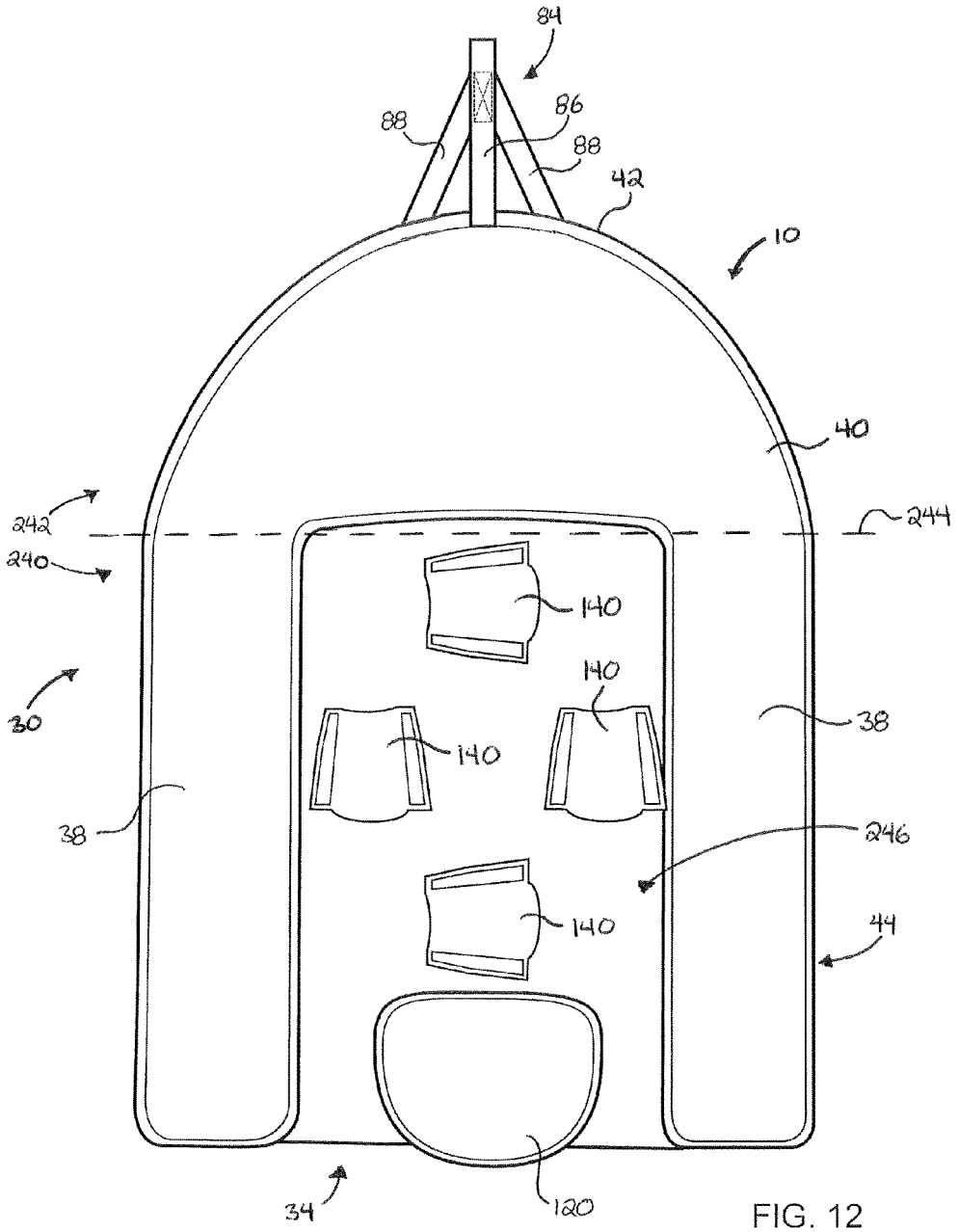
FIG. 12 is a top plan view of yet another embodiment of the invention.

In at least one embodiment, illustrated best in FIGS. 4 and 5, the raft 30 includes a buoyant seat portion 120 positioned substantially on a back half 240 of the device 10, adjacent to the platform 90. It should be noted, as best shown in FIG. 4, for the purpose of accurately describing the present invention, a front half 242 of the device 10 is the portion of device 10 distal to imaginary line 244, and the back half 240 of the device 10 is the portion of the device 10 proximal to imaginary line 244. In the preferred embodiment, the seat portion 120 is an inflatable bladder, having an inflation valve 50, similar to the bladder 40. In alternate embodiments, the seat portion 120 is made of foam, molded plastic, or any other material or method of manufacture, now known or later developed, having sufficiently buoyant properties. During use of the device 10, the person 20 is able to straddle the seat portion 120 while the person's feet 22 are supported by the platform 90 within an at least one footwell 246, formed substantially between the seat portion 120 and pontoons 38, on either side of the seat portion 120, as shown in FIG. 1. In an alternate embodiment, shown in FIG. 12, the seat portion 120 is relatively shorter and configured for allowing the person 20 to sit with their feet 22 supported by the platform 90 substantially in front of them. The seat portion 120 thus makes it easier for the person 20 to transition from a sitting into a standing position, as shown in FIG. 2 for example.

Figure 13:
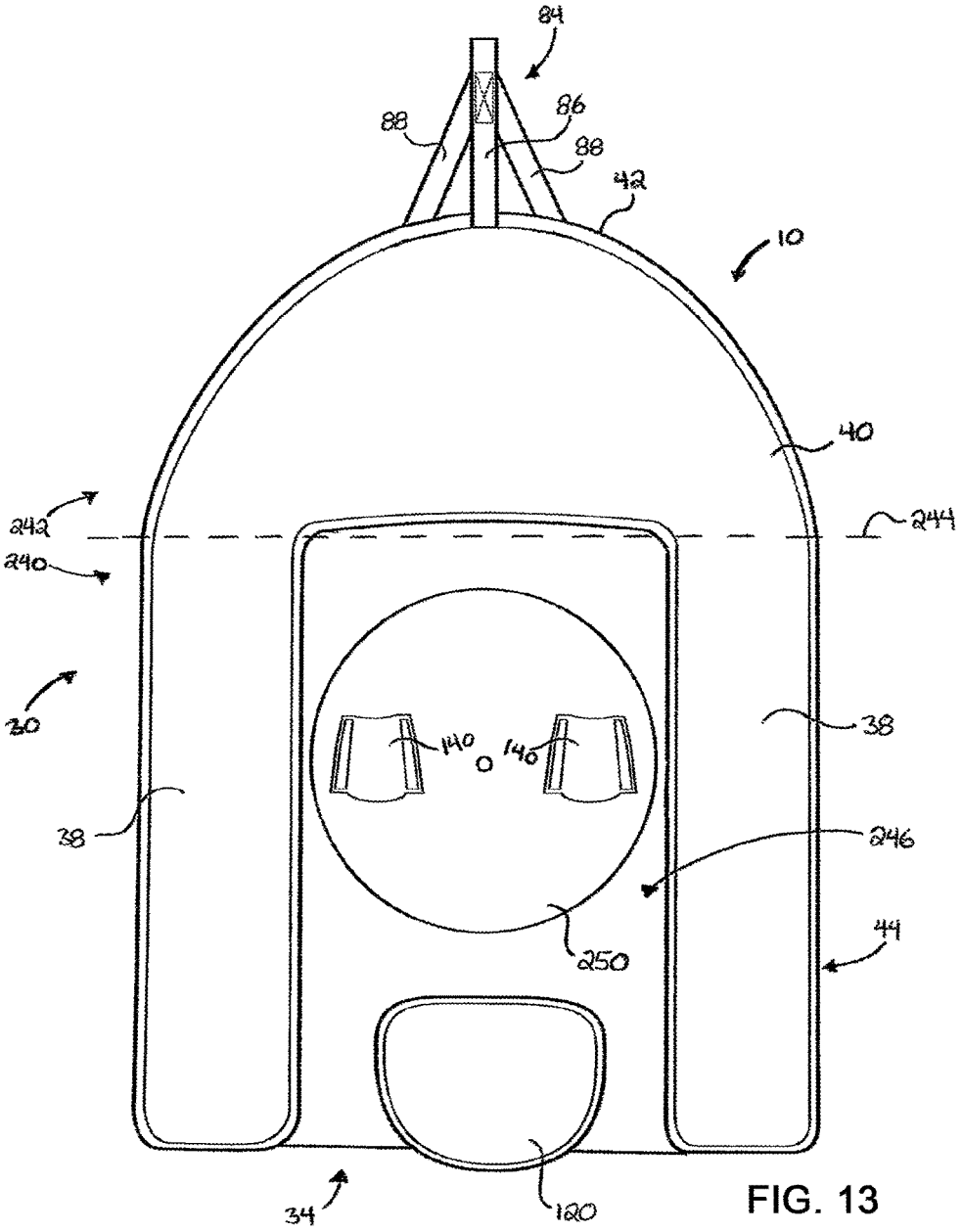
FIG. 13 is a top plan view of yet another embodiment of the invention.
Figure 14:
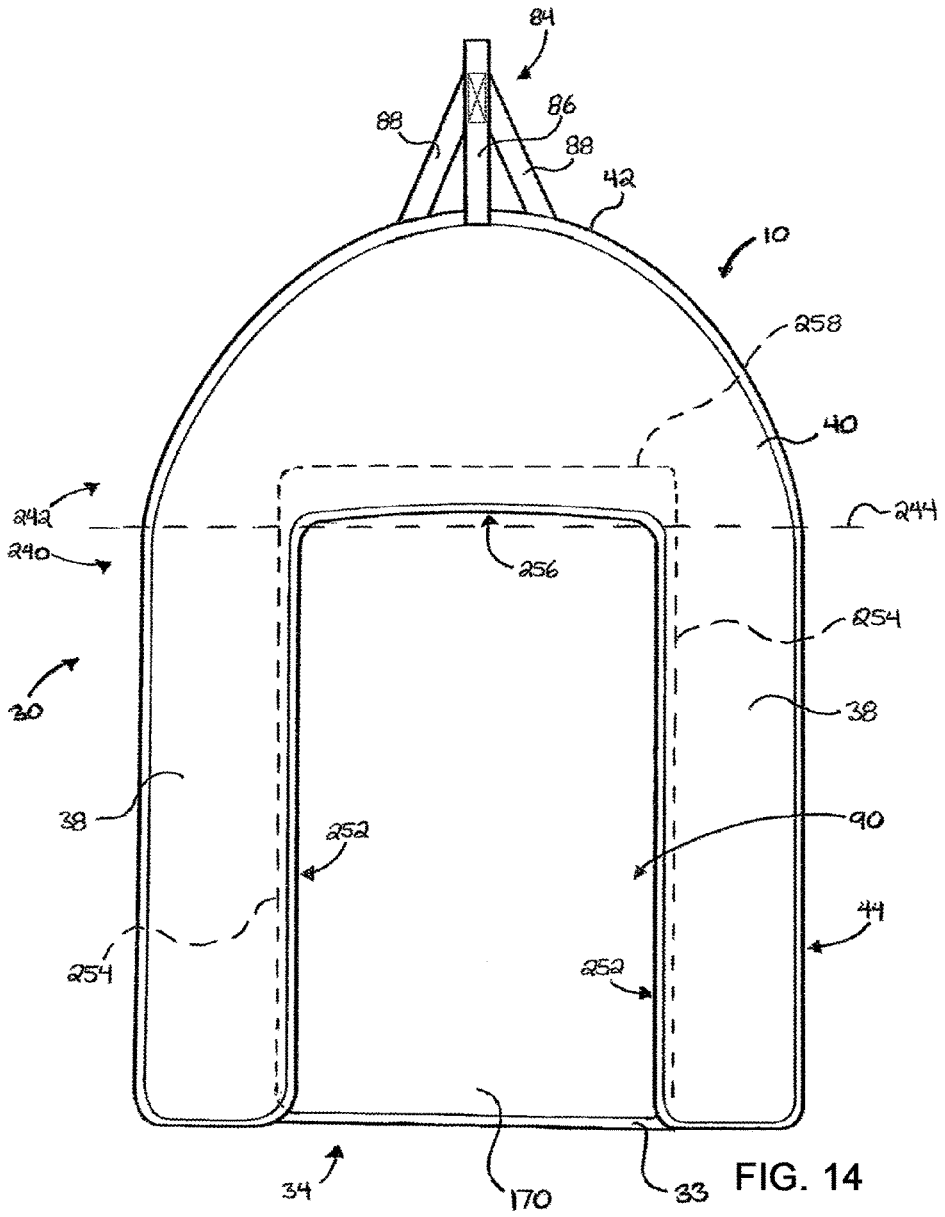
FIGS. 14-16 are top plan views of yet another embodiment of the invention.

Shown best in FIG. 4, the device 10 provides, in the exemplary embodiment, an at least one pair of foot bindings 140 positioned substantially adjacent the platform and configured for securely receiving the person's feet 22, giving the person 20 better stability while using the device 10. In other words, the foot bindings 140 are preferably secured or removably engaged with at least one of the platform 90, first web 60 or second web 70, or some other location substantially adjacent the platform 90. In an embodiment illustrated in FIGS. 3 and 6, the second web 70 further defines a pair of foot binding apertures 130 through which a pair of foot bindings 140 of the platform 90 may extend upwardly from top surface 33. In an alternate embodiment, shown in FIG. 8, the first web 60 defines the foot binding apertures 130 through which the foot bindings 140 of the platform 90 may extend. Alternately, the foot bindings 140 may be removably mounted directly to the platform 90 through the second web 70 (FIG. 4). In the exemplary embodiment, the foot bindings 140 are positioned for allowing the person 20 to stand in a forward-facing orientation, as illustrated best in FIG. 2. In further embodiments, the foot bindings 140 are positioned for allowing the person 20 to stand in a sideways orientation, which is useful when participating in activities such as wakeboarding. In a still further embodiment, shown in FIG. 12, two pairs of foot bindings 140 are provided, a first pair positioned for allowing the person 20 to selectively stand in a forward-facing orientation, and a second pair positioned for allowing the person 20 to selectively stand in a sideways orientation. Additionally, as mentioned above, the seat portion 120 in this further embodiment is preferably shorter, as compared to the seat portion 120 of the exemplary embodiment (FIG. 4) for accommodating the two pairs of foot bindings 140. In a still further embodiment, not shown, the foot bindings 140 are pivotally mounted to either the platform 90, or the first web 60 or second web 70, so as to enable the person 20 to selectively pivot and adjust the orientation of the foot bindings 140 and, thus, the person's stance during use of the device 10. The foot bindings 140 in such embodiments are also preferably selectively lockable so as to prevent them from unintentionally pivoting. In one such embodiment, each of the foot bindings 140 is pivotally mounted directly to either the platform 90, first web 60 or second web 70; thus, allowing each of the foot bindings 140 to pivot independently. In another such embodiment, shown in FIG. 13, the foot bindings 140 are engaged with a turntable 250 that is itself pivotally mounted to either the platform 90, first web 60 or second web 70; thus, allowing the foot bindings 140 to pivot simultaneously with one another. In such embodiments, the turntable 250 is preferably selectively lockable so as to prevent it from unintentionally pivoting. Additionally, the turntable 250 is preferably capable of allowing the person 20 to selectively adjust the resistance associated with the rotation of the turntable 250. In still further embodiments, rather than providing a pair of foot bindings 140, the turntable 250 instead provides a pair of foot recesses sized and configured for accommodating the person's 20 feet.

As mentioned above, in certain embodiments, the platform 90 is capable of being positioned in removable contact with the top surface 33 of the raft 30, with the leading edge 258 and lateral edges 254 of the platform 90 held in contact with the top surface 33 by virtue of the nose recess 256 and lateral recesses 252, respectively. In further such embodiments, where the raft 30 includes the buoyant seat portion 120, shown best in FIGS. 16 and 18, the seat portion 120 similarly provides a perimeter recess 260 along the top surface 33 of the raft 30 when the seat portion 120 is inflated, the perimeter recess 260 being sized and configured for receiving and sandwiching an interior edge 262 of the platform 90 between the seat portion 120 and the top surface 33 of the raft 30. Thus, where the raft 30 is used in combination with a platform 90 having an interior edge 262—such as where the platform 90 is a pair of skis 264, a U-shaped ski training board 160, etc.—with the platform 90 positioned in contact with the top surface 33 and the raft 30 (including the seat portion 120) subsequently inflated, the perimeter recess 260, nose recess 256, and lateral recesses 252 function to substantially prevent such a platform 90 from becoming unintentionally disengaged from the raft 30 during use of the device 10.

Figure 15:
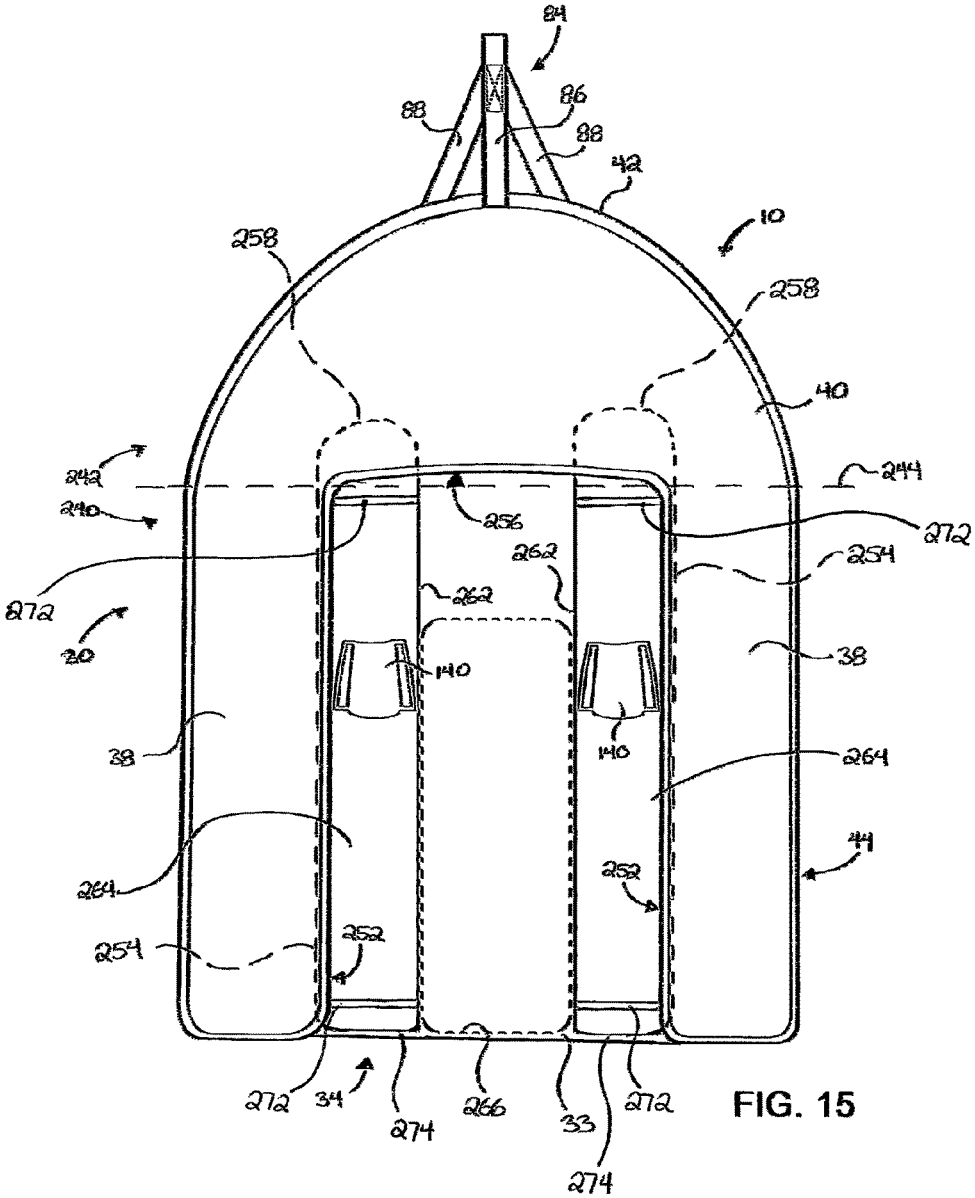
Figure 16:
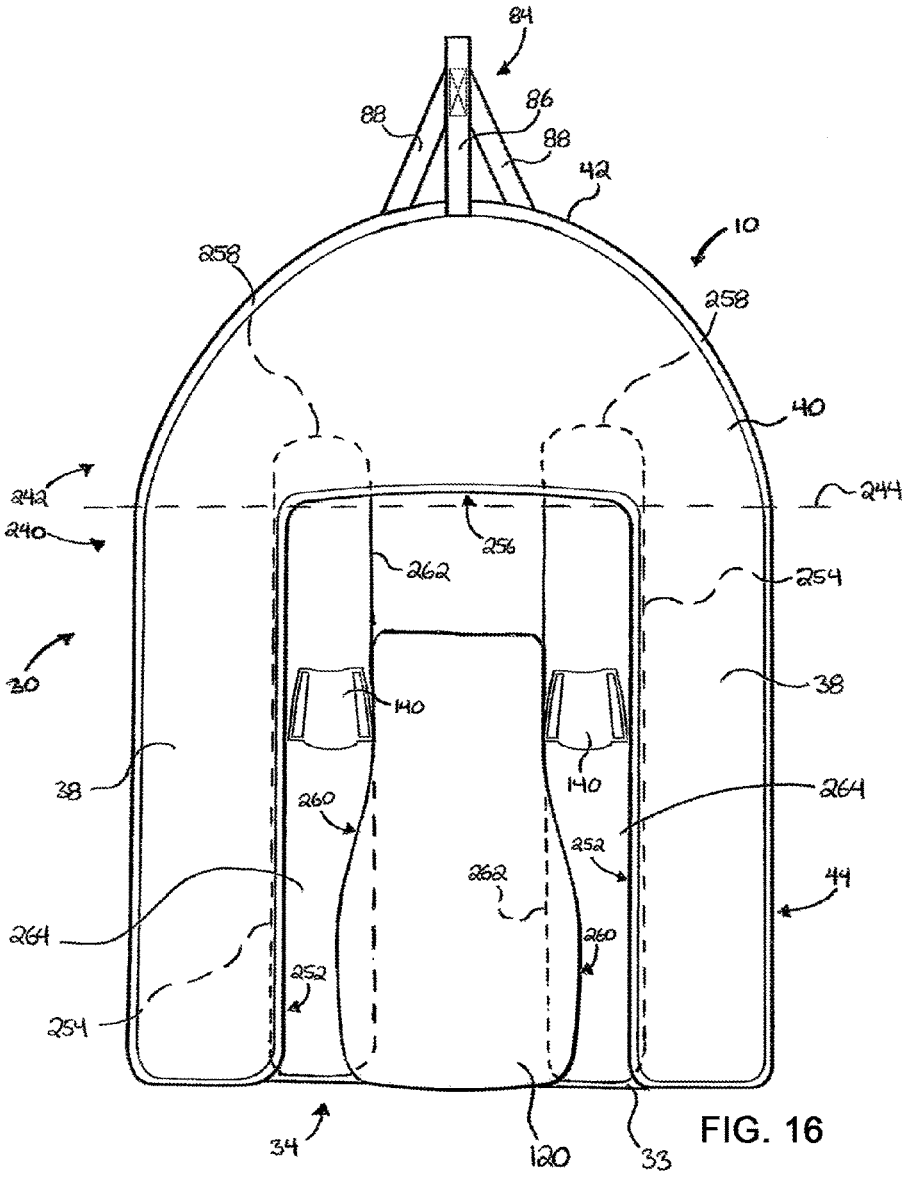
Figure 17:
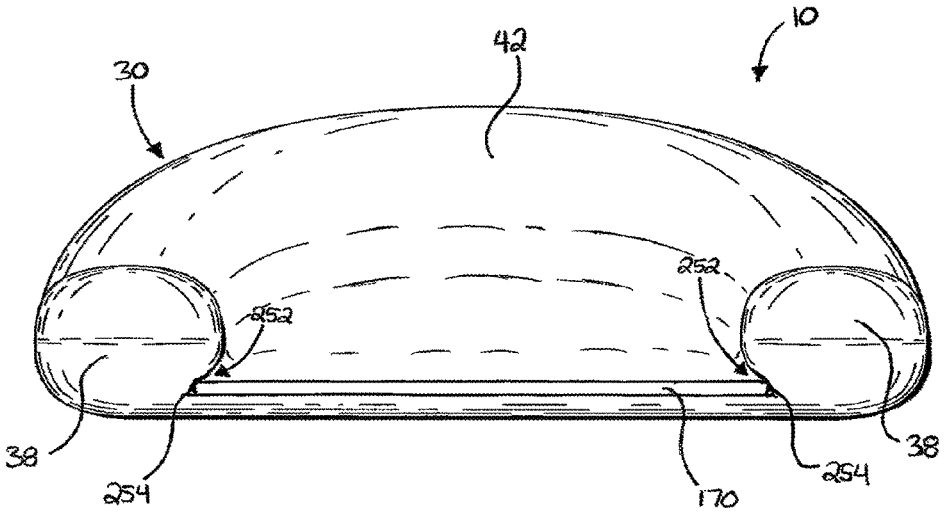
FIG. 17 is a rear elevational view of the embodiment shown in FIG. 14.
Figure 18:
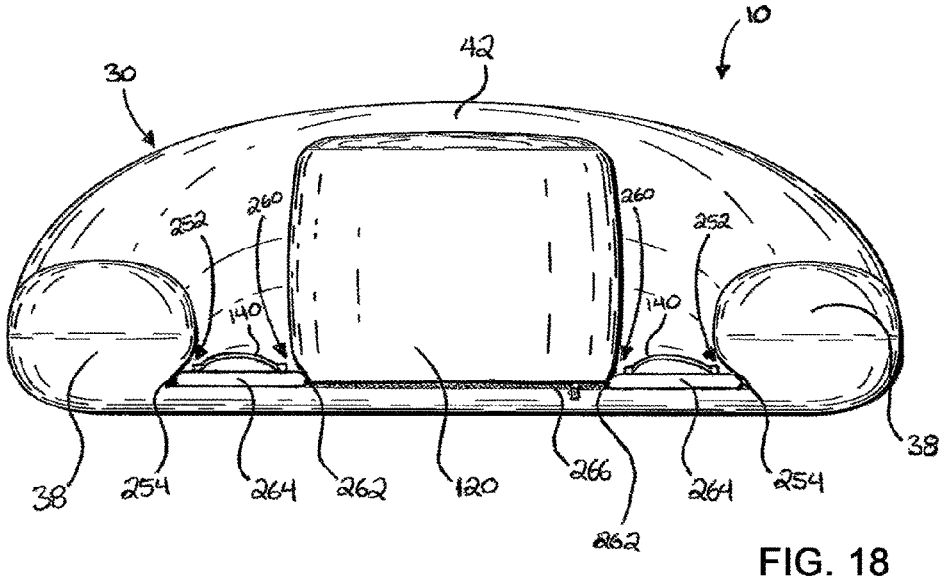
FIG. 18 is a rear elevational view of the embodiment shown in FIG. 16.

Additionally, as illustrated in FIGS. 15, 16 and 18, in such embodiments, the seat portion 120 is preferably configured for being removably engagable with the top surface 33 of the raft 30. This removable engagement is preferably achieved using a zipper 266, as shown in FIGS. 15 and 18. However, in further embodiments, other means for creating a removable engagement between the seat portion 120 and top surface 33, now known or later developed, such as hook-and-loop fasteners, may be substituted. In this way, the seat portion 120 may be selectively removed or attached to the top surface 33 of the raft 30 as needed, depending in part on the type of platform 90 the user 20 desires to use. Thus, again, as discussed further below, the same raft 30 may be selectively used in conjunction with a number of different types of platforms of varying shapes and sizes.

Figure 19:
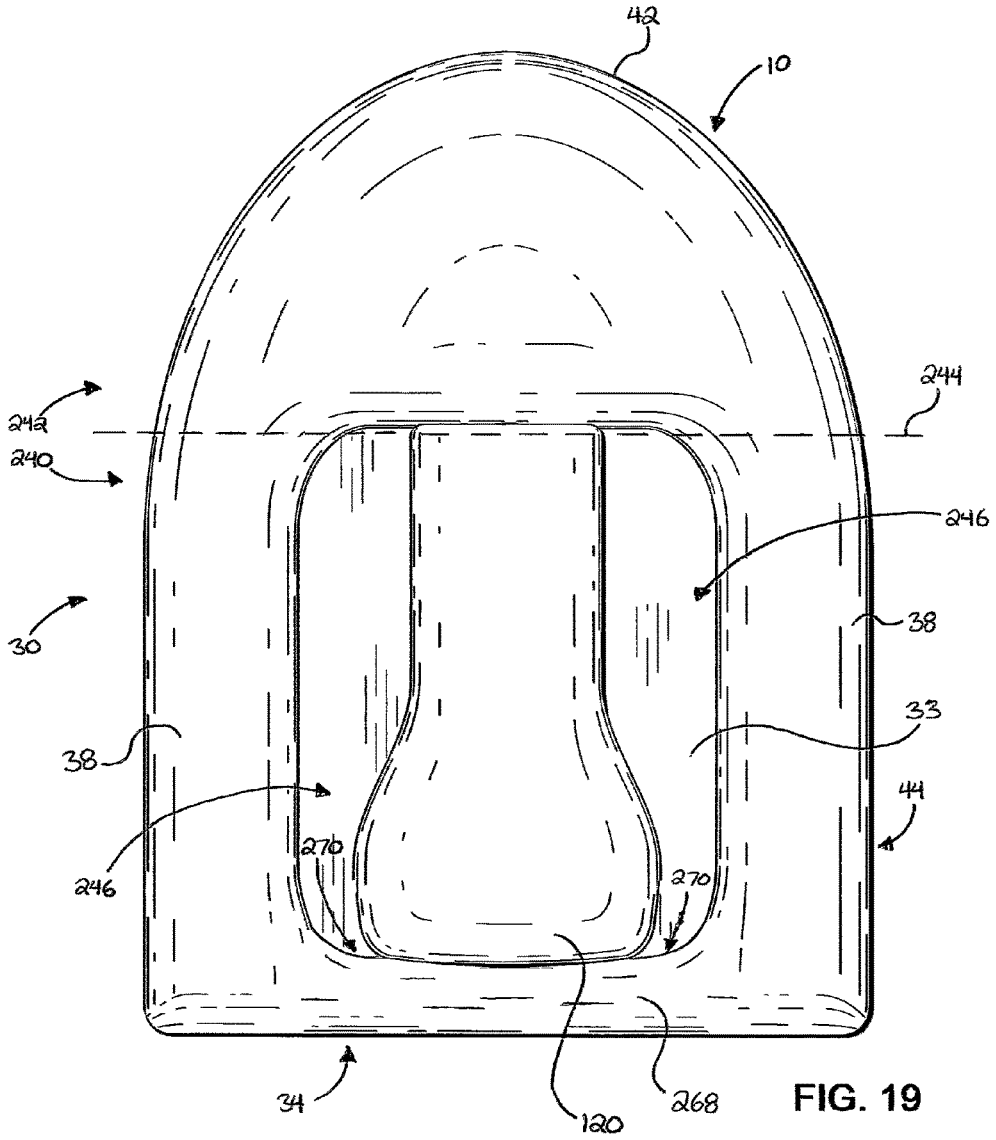
FIG. 19 is a top plan view of yet another embodiment of the invention.

In still further such embodiments, where the bladder 40 is substantially D-shaped in plan view and provides a rear wall 268 extending between the pontoons 38 proximal the rear side 34 of the raft 30, as shown in FIG. 19, the rear wall 268 similarly provides a rear recess 270 along the top surface 33 of the raft 30 when the rear wall 268 is inflated, the rear recess 270 being sized and configured for receiving and sandwiching a rear edge 274 of the platform 90 between the rear wall 268 and the top surface 33 of the raft 30, for further assisting in substantially preventing the platform 90 from becoming unintentionally disengaged from the raft 30 during use of the device 10.

It should be noted that, in still further embodiments, rather than the raft 30 and seat portion 120 each being inflatable, they may alternatively be of other non-inflatable buoyant construction, now known or later developed, with each of the lateral recesses 252, perimeter recess 260, and nose recess 256 being rigidly or resiliently molded for selectively receiving and sandwiching the respective edges 254, 262, and 258 of the platform 90.

In still further embodiments, illustrated in FIG. 15, the raft 30 provides a set of retaining straps 272 integral with the top surface 33 of the raft 30 and configured for further assisting in substantially preventing the platform 90 from becoming unintentionally disengaged from the raft 30 during use of the device 10. Where the platform 90 is a pair of skis 264, the raft 30 preferably provides a retaining strap 272 proximal the leading edge 258 of each ski 264, and a retaining strap 272 proximal the rear edge 274 of each ski 264. It should be noted that, in further embodiments, the raft 30 may incorporate any number of retaining straps 272, and said retaining straps 272 may be integral with any portion of the top surface 33 or elsewhere on the raft 30, so long as the retaining straps 272 are able to substantially carry out the functionality herein described.

Where the platform 90 being used is a pair of skis 264 and the foot bindings 140 of the skis 264 provide a heel piece (not shown) configured for securely retaining the person's foot therewithin during use, the person 20 may choose to remove the heel piece for safety reasons, as the person 20 may not want to have their feet secured within the foot bindings 140 should they lose their balance during use of the device 10 and fall over. Oftentimes, the heel piece is removably engaged with the ski 264 via a plurality of plastic snaps or similar hardware, and that hardware is not capable of being removed. As such, where the heel piece is removed from the ski 264, the upwardly protruding hardware often remains, which could cause the person 20 discomfort when standing on the ski 264. Thus, in further embodiments, the device 10 provides a padded sleeve (not shown) made of neoprene or similar materials and configured for slidable engagement over the ski for covering the heel piece hardware.

Figure 10:
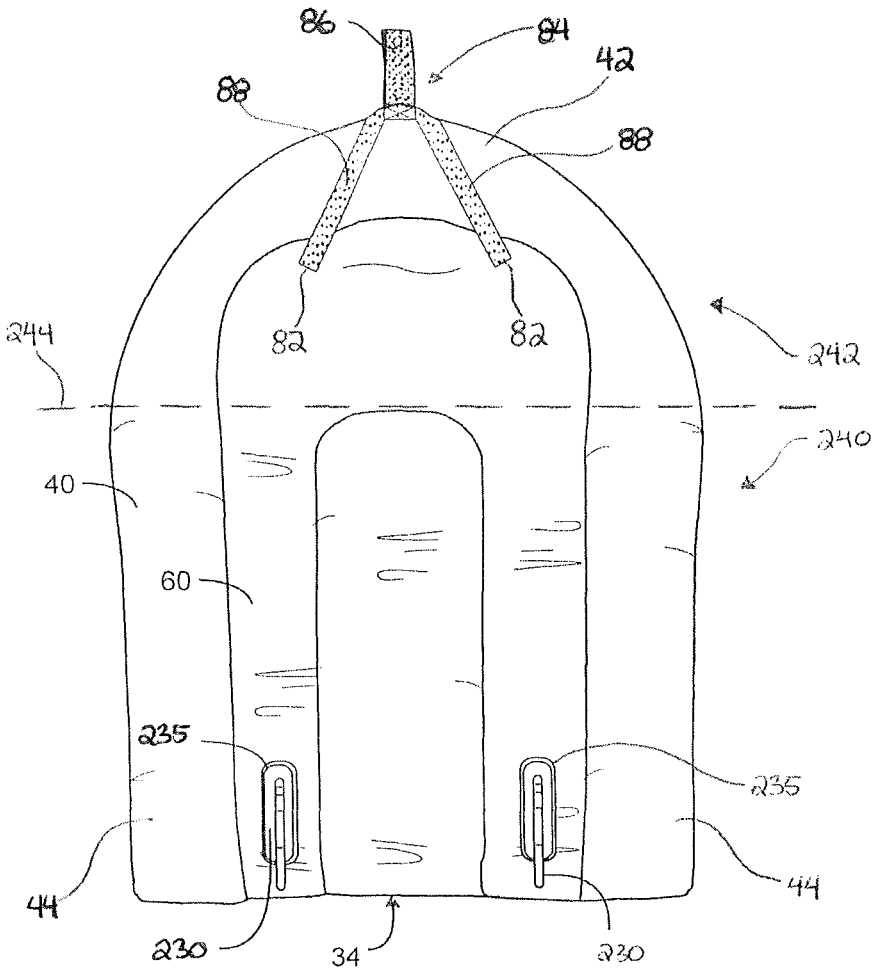
FIG. 10 is a bottom plan view of an exemplary embodiment of the invention.

In an embodiment illustrated in FIGS. 9 and 10, the first web 60 defines an at least one fin aperture 235 through which an at least one fin 230 of the platform 90 may extend downwardly from bottom surface 32. The fins 230 are configured to assist in directional movement of the device 10 when the device 10 is in use. Alternately, the fins 230 may be removably mounted directly to the platform 90 through the first web 60.

Figure 6:
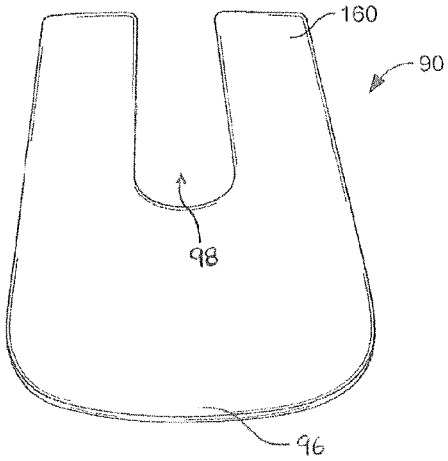
FIG. 6 is a perspective view of a platform of one embodiment of the invention.

In a preferred embodiment, the platform 90 is a rigid U-shaped ski training board 160, as best shown in FIG. 6. In another embodiment, best shown in FIG. 3, the platform 90 is a pliable foam body board 170. FIG. 5 illustrates yet another embodiment with a platform nose 96 of the platform 90 curving in an upwardly direction similar to the nose portion 42, thereby further preventing the nose portion 42 from submerging under the water 12 when the device 10 is being towed. It should be noted that in other embodiments, the platform 90 may be at least one water ski 264 (FIGS. 15, 16 and 18), a kneeboard, a wakeboard, a surfboard, a body board 170 (FIGS. 3, 8, 9, 14 and 17), a substantially circular-shaped disc 248 (FIG. 11), or any other type of water sport board now known or later developed. Additionally, the platform 90 may be made of other types of materials or methods of manufacture now known or later developed, such as foam, plywood or fiberglass. It should be noted that the present invention substantially enhances the performance of the platform 90 and, in certain embodiments, even broadens the applicable scope of the platform 90. For example, where the platform 90 is a body board 170, configured to be traditionally used for riding waves at a beach, the present invention enables the body board 170 to also be towed behind a watercraft by virtue of the tow rope attachment means 80 and additional buoyancy provided by the raft 30.

Due to the buoyant properties of the raft 30, as discussed above, the raft 30 has sufficient perimeter buoyancy to support the weight of the person 20 without submerging. The term "buoyancy" as used in this application is intended to mean the weight of the volume of water 12 displaced by the device 10, or a portion thereof, with respect to the weight of the person 20 using the device 10. The term "perimeter buoyancy" is intended to mean buoyancy that is provided near a perimeter of the device 10. The term "center buoyancy," on the other hand, is intended to mean buoyancy that is provided near the center of the raft 30, such that while the platform 90 may become submerged in the water 12 when the device 10 is at rest, the person 20 will remain substantially out of the water. This center buoyancy also further stabilizes the platform 90, allowing the person 20 to stand, sit, or lay more easily, with relatively greater balance and stability, when the device 10 is in use or at rest. As best shown in FIGS. 4 and 5, the back half 240 of the raft 30, in the exemplary embodiment, is configured for allowing at least some amount of water 12 that may enter the raft 30—namely, the footwells 246—during use to exit the raft 30 proximal the open rear side 34 of the raft 30, such that the back half 240 of the device 10 is capable of substantially maintaining a sufficient center buoyancy. In other words, taking into account the total amount of center buoyancy provided by the device 10, a sufficient amount of water 12 that may enter the raft 30 is able to exit the raft 30 during use so that the appropriate amount of center buoyancy is substantially maintained throughout such use. Even in further embodiments, where the inflatable bladder 40 is substantially circular or O-shaped, or even substantially D-shaped, in plan view, with the perimeter of each footwell 246 being completely enclosed, a sufficient amount of water that may enter the raft 30 during use may still exit the raft 30, by virtue of the footwells 246 being relatively shallow, so as to enable the device 10 to substantially maintain the appropriate amount of center buoyancy. Preferably, the back half 240 has a center buoyancy, as measured by the weight of the volume of water 12 displaced thereby, of greater than at least fifty percent of the weight of the person 20 when in an appropriate starting position, The phrase "starting position" is intended to mean the position that the person 20 is in when the device 10 is at rest. For example, where the person is using the device 10 as a water ski trainer, the appropriate starting position would typically be a seated position on the seat portion 120; where the person is using the device 10 as a body boarding trainer, the appropriate starting position would typically be in a prone or kneeling position on the platform 90 or top surface 33 of the raft 30. It should be noted that, in further embodiments, the center buoyancy may be less than fifty percent of the weight of the person 20 when in the appropriate starting position, such as twenty percent.

In certain embodiments, the center buoyancy of the raft 30 is relatively greater than the perimeter buoyancy of at least one side of the raft 30. In other words, the buoyancy that is provided near the center of the raft 30 comprises relatively more of the total buoyancy of the device 30 than does the buoyancy provided by at least one half of the perimeter (i.e., the nose portion 42 and pontoons 38) of the device 10. This proportional distribution of buoyancy, with relatively more of the buoyancy being maintained near the center of the raft 30, enables the device 10 to provide a substantially more stable and buoyant, yet still maneuverable, riding surface for the person 20, both at rest and while being towed on the device 10.

In one embodiment, the rear portion 44 is configured for providing the entire center buoyancy of the back half 240. In another embodiment, the rear portion 44 and seat portion 120 are configured for providing the entire center buoyancy of the back half 240 in combination. Additionally, where the platform 90 is U-shaped or some other non-continuous planar shape, such as a pair of skis 264, it defines a cutout portion 98 (FIG. 6) sized and configured for allowing the seat portion 120 to be positioned at least partially within the cutout portion 98 and float on the water 12 during use of the device, thereby providing an even greater center buoyancy. In a further embodiment, the platform 90 is of buoyant construction, using materials such as inflatable chambers, foam or the like, and is configured for providing the entire center buoyancy of the back half 240 in combination with the rear portion 44 and/or seat portion 120. It should be noted that other buoyant materials now known or later developed, such as molded plastic, or methods of creating buoyant construction, may be substituted.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor (s) believe that the claimed subject matter is the invention. Furthermore, the various features of each of the above-described embodiments may be combined in any logical manner and are intended to be included within the scope of the present invention.

What is claimed is:

1. A water sport training device for supporting the weight of a person floating on water both at standstill and as being pulled through the water as by a boat, the device comprising:

a raft having a distal nose portion and a proximal rear portion;

the rear portion comprising a pair of substantially spaced apart lateral pontoons and a first web spanning the space therebetween, forming an at least one footwell;

a relatively rigid platform positioned within the raft, substantially adjacent the first web, and configured for providing a substantially stable surface for the person during use of the device;

a buoyant seat portion positioned substantially on a back half of the device between the pontoons and adjacent the platform, the seat portion configured for being in buoyant contact with the water for at least partially contributing to a center buoyancy of the back half of the device, as measured by the weight of the volume of water displaced thereby;

an at least one pair of foot bindings engaged with a turntable pivotally mounted to the platform, allowing the foot bindings to selectively pivot simultaneously with one another relative to the platform; and a tow rope attachment means secured to the raft for selectively towing the device over a body of water;

whereby the back half of the device is capable of substantially maintaining a center buoyancy of greater than at least twenty percent of the weight of the person when in an appropriate starting position.

2. The water sport training device of claim 1, wherein the nose portion of the raft defines a nose portion mid-plane substantially midway through a horizontal thickness of the nose portion, and the two rope attachment means comprises an at least one tow rope attachment point located on the nose portion below the nose portion mid-plane.

3. The water sport training device of claim 1, wherein the platform is of buoyant construction.

4. The water sport training device of claim 1, wherein the entire center buoyancy of the back half of the device is provided by at least one of the rear portion, seat portion, and platform.

5. The water sport training device of claim 1, wherein the platform defines a cutout portion sized and configured for allowing the seat portion to float on the water during use of the device.

6. The water sport training device of claim 1, further comprising a second web spanning the perimeter of the raft offset from the first web, the first and second webs cooperating to define a platform pocket therebetween for receipt of the platform.

7. The water sport training device of claim 1, wherein a first pair of foot bindings is positioned for allowing the person to selectively stand in a forward-facing orientation, and a second pair of foot bindings is positioned for allowing the person to selectively stand in a sideways orientation.

8. The water sport training device of claim 1, wherein each of the foot bindings is configured for selectively pivoting relative to the platform, allowing the person to selectively adjust the orientation of said foot bindings.

9. The water sport training device of claim 1, wherein each of the pontoons provides a lateral recess along a top surface of the first web, each of the lateral recesses being sized and configured for receiving and sandwiching a corresponding lateral edge of the platform between the corresponding pontoon and the top surface of the first web.

10. The water sport training device of claim 9, wherein the nose portion provides a nose recess along the top surface of the first web, the nose recess being sized and configured for receiving and sandwiching a leading edge of the platform between the nose portion and the top surface of the first web.

11. The water sport training device of claim 9, wherein the seat portion provides a perimeter recess along the top surface of the first web, the perimeter recess being sized and configured for receiving and sandwiching an interior edge of the platform between the seat portion and the top surface of the first web.

12. The water sport training device of claim 9, wherein the seat portion is removably engagable with a top surface of the first web, thereby allowing the seat portion to be selectively removed or attached to the top surface of the first web as needed, depending in part on the type of platform being used.

13. The water sport training device of claim 9, wherein the rear portion of the raft further comprises a rear wall extending between the pontoons proximal a rear side of the raft, the rear wall providing a rear recess along the top surface of the first web sized and configured for receiving and sandwiching a rear edge of the platform between the rear wall and the top surface of the first web.

14. The water sport training device of claim 2, wherein the tow rope attachment means is a strap assembly comprising:

an at least one elongate upper strap portion, engaged proximally with the nose portion of the raft and distally with an at least one elongate lower strap portion, the lower strap portion engaged proximally with the nose portion below the nose portion mid-plane, whereby, during use of the device, the direction of pull force applied to the strap assembly is substantially parallel with and below the nose portion mid-plane.

15. The water sport training device of claim 13, wherein the at least one lower strap portion is at least twice as long as the at least one upper strap portion.

16. A water sport training device for supporting the weight of a person floating on water both at standstill and as being pulled through the water as by a boat, the device comprising:

an inflatable raft having a distal nose portion and a proximal rear portion;

the rear portion comprising a pair of substantially spaced apart lateral pontoons and a first web spanning the space therebetween;

a relatively rigid platform removably positionable within the raft, substantially adjacent a top surface of the first web, and configured for providing a substantially stable surface for the person during use of the device;

a buoyant seat portion removably engagable with the top surface of the first web, substantially on a back half of the device between the pontoons and adjacent the platform; and the seat portion providing a perimeter recess along the top surface of the first web when the seat portion is engaged with the first web, the perimeter recess sized and configured for receiving and sandwiching an interior edge of the platform between the seat portion and the top surface of the first web;

whereby, the raft, in combination with the selectively engagable seat portion, is capable of removably receiving a number of different types of platforms of varying shapes and sizes during use of the device.

17. A water sport training device for supporting the weight of a person floating on water both at standstill and as being pulled through the water as by a boat, the device comprising:

a raft having a distal nose portion and a proximal rear portion;

the rear portion comprising:

a pair of buoyant, substantially spaced apart lateral pontoons and a first web spanning the space therebetween;

a buoyant seat portion positioned substantially between the pontoons adjacent the first web, the seat portion configured for being in buoyant contact with the water*, the seat portion having an upper surface that is elevated relative to a respective upper surface of each of the pontoons*; and a buoyant, relatively rigid platform for providing a substantially stable surface on which the person may stand during use of the device, the platform having a non-continuous[, substantially planar] shape and being positionable adjacent the first web, substantially spanning the space between the seat portion and each of the pontoons; [and]

*a handle coupled to the water sport training device by at least one handle rope and configured to be grasped by a user, the handle configured to adjust to the height of the user as the user stands, the handle rope stemming from the nose portion of the raft;* a tow rope attachment [means] secured to the raft for selectively towing the device over a body of water;

whereby, with the pontoons, platform and seat portion each in buoyant contact with the water, the rear portion is capable of substantially maintaining a center buoyancy, as measured by the weight of the volume of water displaced thereby, of greater than at least twenty percent of the weight of the person when in an appropriate starting position.

18. A water sport training device for supporting the weight of a person floating on water both at standstill and as being pulled through the water as by a boat, the device comprising:

a raft having a distal nose portion and a proximal rear portion;

the rear portion comprising a pair of substantially spaced apart lateral pontoons and a first web spanning the space therebetween;

a relatively rigid platform positioned within the raft, substantially adjacent the first web, and configured for providing a substantially stable surface for the person during use of the device;

a buoyant seat portion positioned substantially on a back half of the device between the pontoons and adjacent the platform, the seat portion configured for being in buoyant contact with the water for at least partially contributing to a center buoyancy of the back half of the device, as measured by the weight of the volume of water displaced thereby;

a first pair of foot bindings positioned substantially adjacent the platform for allowing the person to selectively stand in a forward-facing orientation during use of the device;

a second pair of foot bindings positioned substantially adjacent the platform for allowing the person to selectively stand in a sideways orientation during use of the device;

*a handle coupled to the water sport training device by at least one handle rope and configured to be grasped by a user, the handle configured to adjust to the height of the user as the user stands, the handle rope stemming from the nose portion of the raft;* and a tow rope attachment means secured to the raft for selectively towing the device over a body of water;

whereby the back half of the device is capable of substantially maintaining a center buoyancy of greater than at least twenty percent of the weight of the person when in an appropriate starting position.

*19. The water sport training device of claim 18, wherein the first pair of foot bindings is positioned forward of the seat portion.*

*20. The water sport training device of claim 19, wherein the second pair of foot bindings is positioned forward of the seat portion.*

*21. A water sport training device, the device comprising:*

*a raft having a distal nose portion and a proximal rear portion;*

*a pair of side portions spaced apart from one another in a lateral direction and extending between the nose portion and the rear portion;*

*a buoyant seat portion positioned substantially on a back half of the device, the seat portion having an upper surface that is elevated relative to a respective upper surface of each of the side portions;*

*a handle coupled to the water sport training device by at least one handle rope and configured to be grasped by a user, the handle configured to adjust to the height of the user as the user stands, the handle rope stemming from the nose portion of the raft;*

*a tow rope attachment means secured to the raft for selectively towing the device over a body of water, the attachment means comprising at least one tow rope attachment point located on the nose portion; and*

*at least one removably engagable, relatively rigid platform capable of providing a substantially stable surface on which the user can stand during use of the device.*

*22. The water sport training device of claim 21, further comprising a first web that forms a bottom surface of the raft.*

*23. The water sport training device of claim 22, further comprising a second web, wherein the first web and the second web cooperate to define a pocket to receive the relatively rigid platform.*

*24. The water sport training device of claim 23, further comprising a zipper that closes the pocket.*

*25. The water sport training device of claim 21, wherein the at least one relatively rigid platform comprises first and second elongate members.*

*26. The water sport training device of claim 21, wherein the at least one relatively rigid platform comprises first and second water skis.*

*27. The water sport training device of claim 21, further comprising a pair of foot bindings configured to securely receive the user's feet.*

*28. A water sport training device, the device comprising:*

*a raft having a distal nose portion and a proximal rear portion;*

*a pair of side portions spaced apart from one another in a lateral direction and extending between the nose portion and the rear portion;*

*a buoyant seat portion positioned substantially on a back half of the device, the seat portion having an upper surface that is elevated relative to a respective upper surface of each of the side portions;*

*a handle coupled to the water sport training device by at least one handle rope and configured to be grasped by a user, the handle configured to adjust to the height of the user as the user stands, the handle rope stemming from the nose portion of the raft;*

*a tow rope attachment secured to the raft and configured for attachment to a tow rope for selectively towing the device over a body of water, the attachment means comprising at least one tow rope attachment point located on the nose portion; and*

*at least one removably engagable, pliable platform capable of providing a substantially stable surface on which the person can stand during use of the device.*

*29. The water sport training device of claim 28, further comprising a first web that forms a bottom surface of the raft.*

*30. The water sport training device of claim 29, further comprising a second web, wherein the first web and the second web cooperate to define a pocket to receive the pliable platform.*

*31. The water sport training device of claim 30, further comprising a zipper that closes the pocket.*

*32. The water sport training device of claim 28, wherein the at least one pliable platform comprises first and second elongate members.*

*33. The water sport training device of claim 28, further comprising a pair of foot bindings configured to securely receive the user's feet.*

* * * * *